(12) United States Patent
Nakajima et al.

(10) Patent No.: US 10,365,593 B2
(45) Date of Patent: Jul. 30, 2019

(54) SELF-HEATING FUSER ROLLER

(71) Applicants: SUMITOMO ELECTRIC INDUSTRIES, LTD., Osaka-shi, Osaka (JP); SUMITOMO ELECTRIC FINE POLYMER, INC., Sennan-gun, Osaka (JP)

(72) Inventors: Shingo Nakajima, Osaka (JP); Jun Sugawara, Osaka (JP); Kazuhiro Kizawa, Osaka (JP); Yoshitaka Ikeda, Osaka (JP); Masato Tanaka, Osaka (JP)

(73) Assignees: SUMITOMO ELECTRIC INDUSTRIES, INC., Osaka-shi, Osaka (JP); SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 221 days.

(21) Appl. No.: 15/523,740

(22) PCT Filed: Jul. 25, 2016

(86) PCT No.: PCT/JP2016/071668
§ 371 (c)(1),
(2) Date: May 2, 2017

(87) PCT Pub. No.: WO2017/026254
PCT Pub. Date: Feb. 16, 2017

(65) Prior Publication Data
US 2017/0343930 A1 Nov. 30, 2017

(30) Foreign Application Priority Data
Aug. 7, 2015 (JP) .................. 2015-157718

(51) Int. Cl.
G03G 15/20 (2006.01)
G01K 1/16 (2006.01)
G05D 23/24 (2006.01)

(52) U.S. Cl.
CPC .......... G03G 15/2039 (2013.01); G01K 1/16 (2013.01); G03G 15/2053 (2013.01); G05D 23/24 (2013.01); G03G 15/2057 (2013.01)

(58) Field of Classification Search
CPC .......... G03G 15/2039; G03G 15/2053; G05D 23/24; G01K 1/16
See application file for complete search history.

(56) References Cited

U.S. PATENT DOCUMENTS

| | | | | |
|---|---|---|---|---|
| 5,191,381 A | * | 3/1993 | Yuan ................. | G03G 15/2053 219/216 |
| 5,420,392 A | * | 5/1995 | Sakata .............. | G03G 15/2053 219/216 |
| 6,927,006 B2 | * | 8/2005 | Finn et al. ......... | G03G 15/2057 399/333 |

FOREIGN PATENT DOCUMENTS

| | | |
|---|---|---|
| JP | S63-78188 A | 4/1988 |
| JP | H01-260474 A | 10/1989 |

(Continued)

*Primary Examiner* — Kevin L Lee
(74) *Attorney, Agent, or Firm* — Drinker Biddle & Reath LLP

(57) ABSTRACT

The present invention provides a self-heating fuser roller including a tubular resistor layer that generates heat by being supplied with electricity, in which the resistor layer has a plurality of slits. The slits are preferably disposed at regular intervals in a circumferential direction. The slits preferably extend in an axial direction. Preferably, the slits are not provided on both end edges in an axial direction. The slits preferably have an average width of 50 μm or more and 2 mm or less. The slits preferably have an average interval of 30 μm or more and 1 mm or less. The slits are preferably (Continued)

filled with a resin composition. The resistor layer preferably includes a resin matrix and a plurality of electrically conductive particles contained in the resin matrix.

5 Claims, 6 Drawing Sheets

(56) References Cited

FOREIGN PATENT DOCUMENTS

| | | |
|---|---|---|
| JP | H02-285382 A | 11/1990 |
| JP | H02-308291 A | 12/1990 |
| JP | H06-110348 A | 4/1994 |
| JP | H06-208312 A | 7/1994 |
| JP | H10-189221 A | 7/1998 |
| JP | 2011-247929 A | 12/2011 |
| JP | 2011-253141 A | 12/2011 |
| JP | 2014-145828 A | 8/2014 |

\* cited by examiner

SELF-HEATING FUSER ROLLER

TECHNICAL FIELD

The present invention relates to a self-heating fuser roller. The present invention claims the benefit of Japanese Priority Patent Application No. 2015-1557718, filed Aug. 7, 2015, the entire content of which are incorporated herein by reference.

BACKGROUND ART

In image-forming apparatuses such as copy machines and laser beam printers, a heat fixing method is typically employed in the final stage of printing and copying. This heat fixing method is a method for forming an image by allowing a transfer-receiving material, such as a printing sheet to which a toner image has been transferred, to pass between a fuser roller having a heater therein and a pressure roller to thereby melt an unfixed toner by heating and to fix the toner to the transfer-receiving material.

A typically used fuser roller has a structure in which a fluororesin layer is formed on an outer circumferential surface (surface that comes in contact with a transfer-receiving material) of a tubular base formed of a polyimide, metal, or the like either directly or another layer therebetween. A fuser roller in which, for example, a rubber, which is good in terms of elasticity, releasability, abrasion resistance, and the like, is used as the other layer may be referred to as a "fuser sleeve". During printing, the fuser roller is used inside a tubular base. A heater is provided inside the fuser roller, and heat generated from the heater is conducted to the outer circumferential surface of the fuser roller to heat a toner.

However, the existing fuser roller described above has a problem in that the structure of the printer becomes complicated because a heater needs to be provided in the fuser roller.

In view of this, a self-heating fuser roller has been proposed in which electrically conductive particles are dispersed in a resin layer near a surface of the fuser roller, the resin layer functioning as a resistor capable of generating heat by being supplied with electricity (refer to Japanese Unexamined Patent Application Publication No. 2014-145828).

CITATION LIST

Patent Literature

PTL 1: Japanese Unexamined Patent Application Publication No. 2014-145828

SUMMARY OF INVENTION

Solution to Problem

A self-heating fuser roller according to an embodiment of the present invention includes a tubular resistor layer that generates heat by being supplied with electricity, in which the resistor layer has a plurality of slits.

DESCRIPTION OF EMBODIMENTS

Technical Problem

Figure 1:
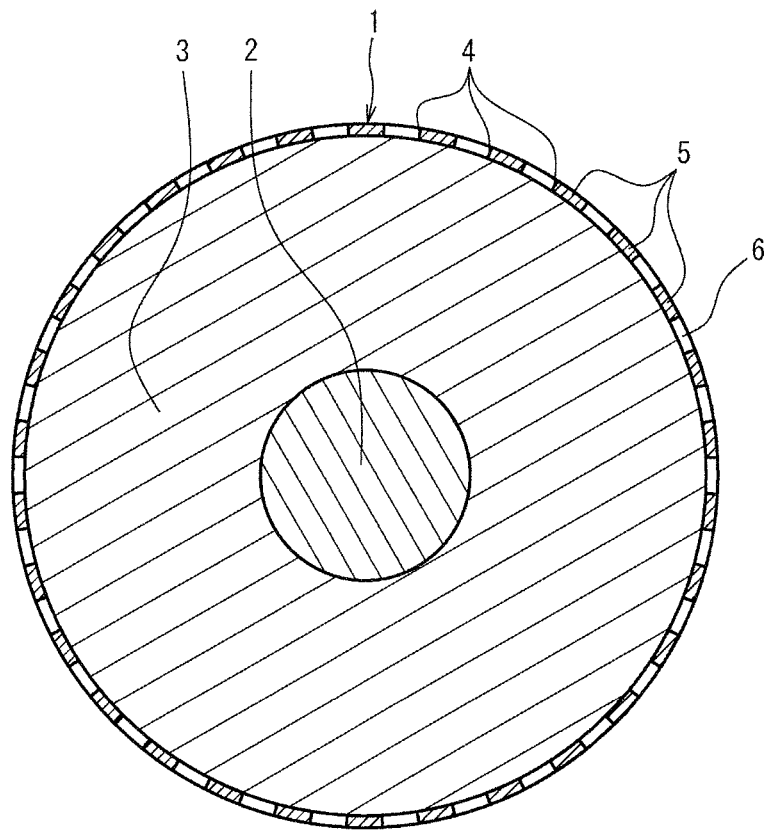
FIG. 1 is a schematic sectional view in the radial direction, the sectional view illustrating a self-heating fuser roller according to an embodiment of the present invention.

In the self-heating fuser roller disclosed in the above patent application publication, formation of cracks on the surface of the roller may cause a local increase in the current density because the current bypasses the cracks. In particular, cracks on the surface of a self-heating fuser roller are often formed so as to extend in the circumferential direction, and abnormal heat generation may occur on both sides of the cracks in the circumferential direction.

The present invention has been made in view of the circumstances described above. An object of the present invention is to provide a self-heating fuser roller capable of suppressing abnormal heat generation when cracks are formed on the surface thereof.

Advantageous Effects of Disclosure

The self-heating fuser roller according to an embodiment of the present invention can suppress abnormal heat generation when cracks are formed on the surface thereof.

DESCRIPTION OF EMBODIMENTS OF INVENTION

A self-heating fuser roller according to an embodiment of the present invention includes a tubular resistor layer that generates heat by being supplied with electricity, in which the resistor layer has a plurality of slits.

The self-heating fuser roller includes a tubular resistor layer having a plurality of slits and thereby has a plurality of heat-generating portions that are electrically isolated by the slits and arranged in parallel. According to the self-heating fuser roller, when cracks are formed in the resistor layer, the heat-generating portions in the area are torn, and the current consequently does not flow in the torn heat-generating portions. Thus, the current that is to bypass the cracks is blocked. With this structure, the self-heating fuser roller prevents the current from concentrating near the cracks and can suppress abnormal heat generation.

The slits are preferably disposed at regular intervals in a circumferential direction. By providing the slits at regular intervals in the circumferential direction, heat-generating portions are formed in the resistor layer at regular intervals, and the resistor layer generates heat substantially uniformly in the circumferential direction. Consequently, relatively stable fixing can be performed. Note that the term "regular interval" means that the maximum of the difference between the interval between adjacent slits and an average interval of all the intervals is 10% or less, and preferably 5% or less.

The slits preferably extend in an axial direction. By providing the slits so as to extend in the axial direction, heat-generating portions extending in the axial direction are formed between the slits, and a flow of the current in the circumferential direction can be efficiently suppressed. Accordingly, abnormal heat generation can be more reliably suppressed.

Preferably, the slits are not provided on both end edges in an axial direction. When the slits are not provided on both end edges in the axial direction, the plurality of heat-generating portions formed between the slits are electrically connected in parallel. This structure enables all the heat-generating portions except for those torn as a result of formation of cracks to easily generate heat.

The slits preferably have an average width of 50 μm or more and 2 mm or less. When the average width of the slits is in the above range, it is possible to prevent the heat-generating portions formed by the slits from being in contact with each other and to reduce the variation in a surface temperature of the self-heating fuser roller.

The slits preferably have an average interval of 30 μm or more and 1 mm or less. When the average interval between the slits is in the above range, the heat-generating portions formed between the slits can stably generate heat, and it is possible to accelerate the effect of suppressing abnormal heat generation due to formation of cracks in the heat-generating portions.

The slits are preferably filled with a resin composition. By filling the slits with a resin composition, the surface of the self-heating fuser roller becomes relatively flat, and a toner image can be fixed by relatively uniformly heating.

The resistor layer preferably includes a resin matrix and a plurality of electrically conductive particles contained in the resin matrix. When the resistor layer includes a resin matrix and a plurality of electrically conductive particles contained in the resin matrix, formability (including formability of slits), heat-generating properties, and flexibility of the resistor layer can be improved. Accordingly, the performance of the self-heating fuser roller can be relatively easily enhanced.

DETAILED DESCRIPTION OF EMBODIMENTS OF INVENTION

Self-heating fuser rollers according to embodiments of the present invention will now be described in detail with reference to the drawings.

First Embodiment

Figure 2:
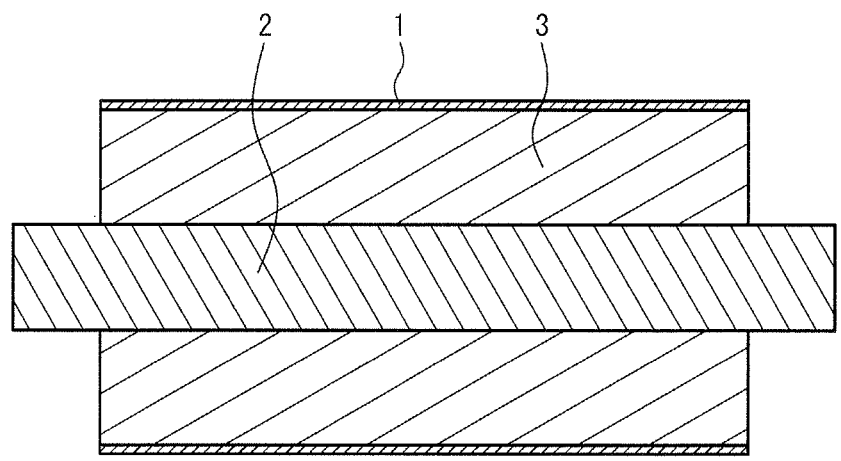
FIG. 2 is a schematic sectional view in the axial direction, the sectional view illustrating the self-heating fuser roller in FIG. 1.
Figure 3:
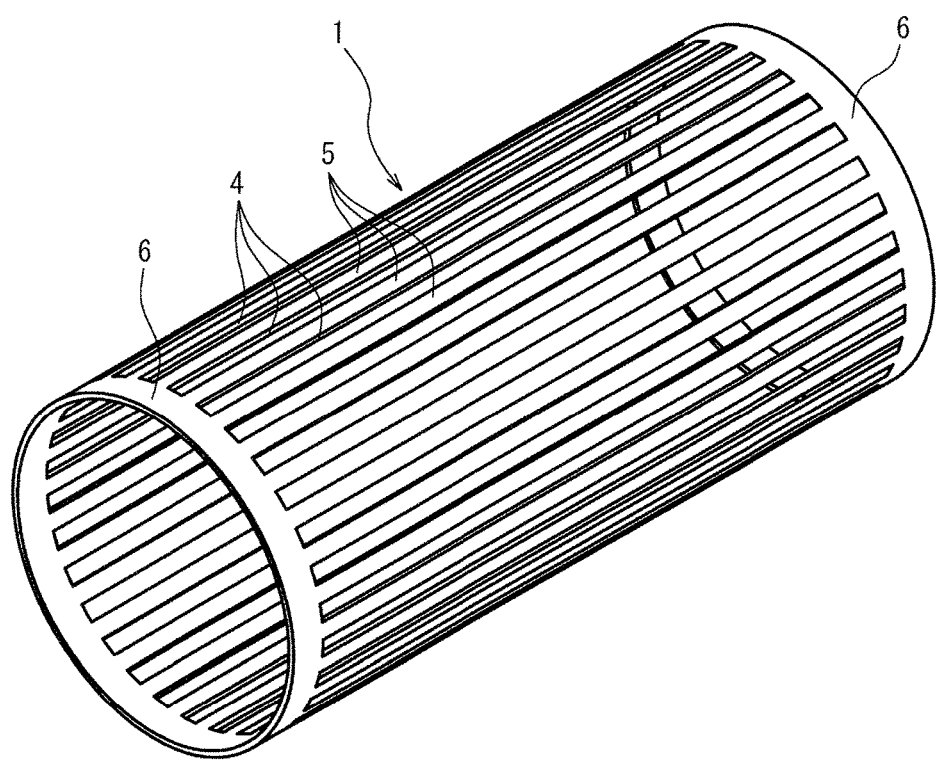
FIG. 3 is a schematic perspective view illustrating a resistor layer of the self-heating fuser roller in FIG. 1.

A self-heating fuser roller according to an embodiment of the present invention illustrated in FIGS. 1 and 2 includes a resistor layer 1 illustrated in FIG. 3. The self-heating fuser roller further includes a columnar core bar 2 and a cylindrical heat-insulating layer 3 formed on the outer circumferential surface of the core bar 2. The resistor layer 1 is formed on the outer circumferential surface of the heat-insulating layer 3.

<Resistor Layer>

The resistor layer 1 is formed to have a tubular shape. When electricity is supplied to the resistor layer 1, joule loss occurs and the resistor layer 1 generates heat. This resistor layer 1 has a plurality of slits 4. Accordingly, the resistor layer 1 includes heat-generating portions 5 formed between the plurality of slits 4.

Preferably, the slits 4 of the resistor layer 1 are not provided on both end edges of the resistor layer 1 in the axial direction, as illustrated in the figure. In other words, the resistor layer 1 includes a pair of ring-shaped connecting portions 6 that extend over the entire circumference near the end edges and that connect ends of the plurality of heat-generating portions 5 together. Accordingly, the plurality of heat-generating portions 5 formed between the slits 4 are electrically connected in parallel. This structure enables all the heat-generating portions 5 except for those torn as a result of formation of cracks to easily generate heat.

The slits 4 are preferably disposed at regular intervals in the circumferential direction. This structure can efficiently suppress the flow of the current in the circumferential direction. Accordingly, abnormal heat generation can be suppressed relatively reliably, and uneven heat generation of the self-heating fuser roller in the circumferential direction can be reduced to realize stable fixing of a toner.

The slits 4 may extend in a bending manner, but preferably extend in a linear manner. By forming the slits 4 in a linear manner, the accuracy of the resistor layer 1 can be relatively easily improved.

The slits 4 may extend, for example, in a spiral manner. However, the slits 4 preferably extend in the axial direction, that is, in parallel with the central axis of the resistor layer 1. Formation of the resistor layer 1 is facilitated by forming the slits 4 in the axial direction. Specifically, in the case where the slits 4 extend in the axial direction, the self-heating fuser roller can be relatively easily formed by coating or extrusion. Also in the case where the self-heating fuser roller is formed by winding, on another component, a sheet-like resistor layer 1 or a resistor layer 1 formed on a sheet-like base layer, the production of the self-heating fuser roller is facilitated because the slits 4 extend in the axial direction and thus the heat-generating portions 5 need not be connected together.

The material that forms the resistor layer 1 may be any material in which a current can be allowed to flow and which generates heat due to ohmic loss, and is preferably a resistor that includes a resin matrix and a plurality of electrically conductive particles contained in the resin matrix. Regarding such a resistor including a resin matrix and a plurality of electrically conductive particles dispersed in the resin matrix, a resistor having desired formability, heat-generating properties, and flexibility can be relatively easily selected. Therefore, use of such a resistor can relatively easily realize a high performance and a reduction in the cost of the self-heating fuser roller. Note that the term "formability of a resistor" covers not only the ease of formation of a layered resistor but also the ease of formation of the slits 4.

Specifically, the resistor layer 1 can be formed by forming a resistor that includes a resin matrix and a plurality of electrically conductive particles dispersed in the resin matrix on the outer circumferential surface of the heat-insulating layer 3 by, for example, a method such as coating or printing. Examples of the coating method include methods using a dispenser, a coater, or the like. Examples of the printing method include screen printing and ink jet printing. Alternatively, the resistor layer 1 may be formed by extrusion. Alternatively, a resistor may be formed over the entire outer circumferential surface of the heat-insulating layer 3, and the resistor may be partially removed to form the slits 4.

Examples of a main component of the resin matrix of the resistor layer 1 include synthetic resins and rubbers that have heat resistance. Among these, heat-resistant resins are preferable. Examples of the heat-resistant resins include polyimides and polyamides. Polyimides, which have good heat resistance and mechanical strength, are particularly preferable. Silicone rubber, fluororubber, or a mixture thereof may be used as the heat-resistant rubber. Note that the term "main component" refers to a component having the highest mass content.

The electrically conductive particles may be known electrically conductive particles. Examples of the electrically conductive particles include metal particles such as gold particles and nickel particles; metal-plated resin particles; and carbon particles such as carbon black and carbon nanotubes. Among these, from the viewpoint of heat resistance and electrical conductivity, the electrically conductive particles preferably contain a carbon powder, and more preferably are a mixture of a metal powder and a carbon powder. The metal powder is preferably a nickel powder.

When the electrically conductive particles are a mixture of a metal powder and a carbon powder, the upper limit of the ratio of the carbon powder in the electrically conductive particles of the resistor layer 1 is preferably 97% by volume and more preferably 95% by volume. The lower limit of the ratio of the carbon powder in the electrically conductive particles of the resistor layer 1 is preferably 30% by volume, and more preferably 50% by volume. When the ratio of the carbon powder in the electrically conductive particles of the resistor layer 1 exceeds the upper limit, the metal powder is not uniformly dispersed, and it may become difficult to make the electrical resistance of the resistor layer 1 uniform. On the other hand, when the ratio of the carbon powder in the electrically conductive particles of the resistor layer 1 is less than the lower limit, the decrease in the electrical resistance of the resistor layer 1 due to the electrically conductive particles is significant, and it may become difficult to adjust the electrical resistance of the resistor layer 1.

The electrically conductive particles in the resistor layer 1 preferably have a needle-like shape. When the electrically conductive particles have a needle-like shape, by orienting the electrically conductive particles, the electrical resistivity of the resistor layer 1 can be made low in a direction in which the electrically conductive particles are oriented and made high in a direction perpendicular to the direction in which the electrically conductive particles are oriented. Accordingly, the electrical resistivity of the resistor layer 1 in the axial direction can be made lower than the electrical resistivity of the resistor layer 1 in the circumferential direction. In this case, since the current flows stably in the axial direction, heat characteristics are stabilized.

The lower limit of the aspect ratio of the electrically conductive particles is preferably 1.5, and more preferably 2.0. The upper limit of the aspect ratio of the electrically conductive particles is preferably 1,000, and more preferably 100. When the aspect ratio of the electrically conductive particles is less than the lower limit, the difference between the electrical resistivity in the axial direction and the electrical resistivity in the circumferential direction may not be provided. When the aspect ratio of the electrically conductive particles exceeds the upper limit, coating of the resistor layer 1 may not be easily performed.

Examples of the needle-like carbon powder include carbon nanotubes (hereinafter, may be referred to as "CNTs"). CNTs are nano-sized cylindrical form of carbon. CNTs typically have a specific gravity of about 2.0, and an aspect ratio (ratio of the length to the diameter) of 50 or more and 1,000 or less. CNTs are typically classified into single-wall carbon nanotubes and multi-wall carbon nanotubes. The multi-wall CNTs have a structure in which a plurality of carbon tubes are concentrically arranged. Known methods for producing a CNT may be used. However, a vapor-phase growth method, with which the diameter of a CNT is easily controlled and which has good mass production efficiency, is preferable.

The upper limit of the average diameter of CNTs is preferably 500 nm, and more preferably 300 nm. The lower limit of the average diameter is preferably 100 nm. When the average diameter exceeds the upper limit, flexibility of the resistor layer 1 and smoothness of the surface thereof may decrease. When the average diameter is less than the lower limit, dispersibility of the CNTs may decrease, resulting in a decrease in mechanical strength of the resistor layer 1, or production efficiency of the CNTs may decrease. Note that the average diameter of CNTs is the average of the minor axis diameter of CNTs measured by, for example, a laser scattering method or scanning electron microscopy.

The upper limit of the average length of CNTs is preferably 50 μm, more preferably 30 μm, and still more preferably 20 μm. The lower limit of the average length is preferably 1 μm. When the average length exceeds the upper limit, dispersibility of the CNTs may decrease, resulting in a decrease in mechanical strength of the resistor layer 1, or smoothness of the surface of the resistor layer 1 may decrease. When the average length is less than the lower limit, the resistor layer 1 may have insufficient mechanical strength such as breaking elongation. Note that the average length of CNTs is the average of the length of CNTs measured by, for example, a laser scattering method or scanning electron microscopy.

As a carbon powder having a shape other than a needle-like shape, for example, shell-like carbon particles may be used. When such shell-like carbon particles are used, the electrical resistance of the resistor layer 1 changes gently with respect to the amount of carbon powder added, and thus the electrical resistance of the resistor layer 1 can be easily adjusted.

The needle-like metal powder is, for example, a needle-like nickel powder but is not particularly limited.

The upper limit of the content of the electrically conductive particles in the resistor layer 1 is preferably 60% by volume, more preferably 55% by volume, and still more preferably 50% by volume. The lower limit of the content is preferably 5% by volume, more preferably 10% by volume, and still more preferably 15% by volume. When the content exceeds the upper limit, heat resistance, mechanical strength, etc. of the resistor layer 1 may decrease. When the content is less than the lower limit, it may become difficult to control the resistance of the resistor layer 1 in a desired range.

The upper limit of the average thickness of the resistor layer 1 is preferably 300 μm, more preferably 250 μm, and still more preferably 200 μm. The lower limit of the average thickness is preferably 5 μm, more preferably 10 μm, and still more preferably 30 μm. When the average thickness exceeds the upper limit, the production cost of the self-heating fuser roller may increase. When the average thickness is less than the lower limit, the resistor layer 1 may be easily damaged by heat or shock.

The upper limit of the electrical resistance between the two ends of the resistor layer 1 is preferably 100Ω, more preferably 80Ω, and still more preferably 60Ω. The lower limit of the electrical resistance between the two ends of the resistor layer 1 is preferably 5Ω, more preferably 7.5Ω, and still more preferably 10Ω. When the resistance exceeds the upper limit, the voltage necessary for increasing the temperature of the resistor layer 1 increases, and a power supply unit for driving the self-heating fuser roller may become unnecessarily expensive. When the resistance is less than the lower limit, the current necessary for increasing the temperature of the resistor layer 1 increases, and a power supply unit for driving the self-heating fuser roller may also become unnecessarily expensive.

The upper limit of the electrical resistance (length resistivity) per unit length of the resistor layer 1 in the axial direction is preferably 1,000 Ω/m, more preferably 800 Ω/m, and still more preferably 600 Ω/m. The lower limit of the length resistivity is preferably 0.01 Ω/m, more preferably 0.1 Ω/m, and still more preferably 1 Ω/m. When the length resistivity exceeds the upper limit, the electrical resistance of the resistor layer 1 may be excessively high. When the length resistivity is less than the lower limit, the electrical resistance of the resistor layer 1 may be excessively low.

Furthermore, the resistor layer 1 may contain an insulating filler. By incorporating an insulating filler, electrical contact between electrically conductive particles is limited so that the electrical resistance of the resistor layer 1 can be relatively easily adjusted.

The insulating filler may be formed of any material having an insulating property. An inorganic filler having a high thermal conductivity, such as titanium oxide, metal silicon, magnesium oxide, magnesium carbonate, magnesium hydroxide, silicon oxide, alumina, boron nitride, or aluminum nitride is preferably used.

(Slit)

The slits 4 divide at least part of the resistor layer 1 in the circumferential direction and define a plurality of heat-generating portions 5. The slits 4 are not limited to slits that penetrate the resistor layer 1 in the thickness direction. Alternatively, the slits 4 may be groove-like slits which increase the electrical resistance by partially decreasing the thickness of the resistor layer 1. Accordingly, the slits 4 are portions having a sheet resistivity 10 times or more, preferably 100 times or more the sheet resistivity of other portions of the resistor layer 1.

The lower limit of the average width of the slits 4 is preferably 50 and more preferably 80 The upper limit of the average width of the slits 4 is preferably 2 mm, and more preferably 1 mm. When the average width of the slits 4 is less than the lower limit, short-circuit between heat-generating portions 5 on both sides of a slit 4 may be caused by, for example, deformation during the formation of a nip. When the average width of the slits 4 exceeds the upper limit, an uneven temperature distribution is formed on the surface of the self-heating fuser roller, which may result in uneven fixing.

The lower limit of the average interval between the slits 4 (average width of the heat-generating portions 5) is preferably 30 and more preferably 50 μm. The upper limit of the average interval between the slits 4 is preferably 1 mm, and more preferably 0.5 mm. When the average interval between the slits 4 is less than the lower limit, the amount of heat generated may become insufficient. When the average interval between the slits 4 exceeds the upper limit, even in the case where cracks are formed, the heat-generating portions 5 do not tear, which may cause abnormal heat generation due to the current concentration.

The slits 4 are preferably filled with a resin composition. When the slits 4 are filled with a resin composition, the self-heating fuser roller has a flat surface and can uniformly come in contact with recording paper under pressure. The resin composition filling the slits 4 has an electrical resistivity 10 times or more, and preferably 100 times or more the electrical resistivity of the heat-generating portions 5, and more preferably has an insulating property.

In addition, since heat is conducted from the heat-generating portions 5 to the resin composition filling the slits 4, an uneven temperature distribution on the surface of the self-heating fuser roller can also be reduced. For this purpose, the resin composition filling the slits 4 may contain a thermally conductive filler.

(Heat-Generating Portion)

As described above, the plurality of heat-generating portions 5 of the resistor layer 1 are formed from the resistor that is left between the plurality of slits 4 of the resistor layer 1. The heat-generating portions 5 are each preferably formed to have a belt shape having a substantially uniform width, and more preferably formed to have a stripe shape extending in the axial direction.

(Connecting Portion)

The pair of connecting portions 6 of the resistor layer 1 forms at least a part a pair of electrodes for applying a voltage to each of the heat-generating portions 5. In order to distribute a current to the plurality of heat-generating portions 5 relatively uniformly, a ring-shaped component having electrical conductivity may be formed on each of the connecting portions 6.

In order to supply a current, for example, a contactor (not shown) such as a carbon brush may be in contact with the connecting portion 6. Accordingly, the average width of the connecting portion 6 in the axial direction is preferably equal to or more than the width of the contactor used. The average width of the connecting portion 6 in the axial direction is not particularly limited but may be, for example, 0.2 cm or more and 2 cm or less.

<Core Bar>

The core bar 2 extends in the axial direction at the center of the self-heating fuser roller. The core bar 2 may be hollow or solid.

The core bar 2 may be formed of a metal such as aluminum, an aluminum alloy, iron, or stainless steel, or a heat-resistant resin such as a polyimide or a polyamide. Among heat-resistant resins, polyimides, which have good formability, good heat resistance, and good mechanical strength, are preferable.

The core bar 2 may have an average outer diameter of, for example, 5 mm or more and 40 mm or less. When the core bar 2 is hollow, the core bar 2 may have an average thickness of, for example, 10 μm or more and 40 mm or less. The core bar 2 may have a length in the axial direction of, for example, 100 mm or more and 500 mm or less.

<Heat-Insulating Layer>

The heat-insulating layer 3 suppresses dissipation of heat generated by the resistor layer 1 toward the core bar 2 to improve the energy efficiency of the self-heating fuser roller. The heat-insulating layer 3 preferably includes a matrix that contains a synthetic resin or rubber as a main component, and a plurality of pores contained in the matrix. Furthermore, the heat-insulating layer 3 preferably has elasticity.

The rubber used as the main component of the matrix of the heat-insulating layer 3 is not particularly limited as long as the rubber has heat resistance, but preferably has elasticity. A rubber having good heat resistance (heat-resistant rubber) is particularly preferable. A silicone rubber, a fluororubber, or a mixture thereof can be suitably used as the heat-resistant rubber.

Examples of the silicone rubber include dimethyl silicone rubber, fluorosilicone rubber, and methyl phenyl silicone rubber. Examples of the fluororubber include vinylidene fluoride rubber, tetrafluoroethylene-propylene rubber, and tetrafluoroethylene-perfluoromethylvinylether rubber.

Examples of the synthetic resin include phenolic resins (PF), epoxy resins (EP), melamine resins (MF), urea resins (UF), unsaturated polyester resins (UP), alkyd resins, polyurethanes (PUR), thermosetting polyimides (PI), polyethylene (PE), high-density polyethylene (HDPE), medium-density polyethylene (MDPE), low-density polyethylene (LDPE), polypropylene (PP), polyvinyl chloride (PVC), polyvinylidene chloride, polystyrene (PS), polyvinyl acetate (PVAc), acrylonitrile-butadiene-styrene resins (ABS), acrylonitrile-styrene resins (AS), polymethyl methacrylate (PMMA), polyamides (PA), polyacetal (POM), polycarbonate (PC), modified polyphenylene ethers (m-PPE), polybutylene terephthalate (PBT), polyethylene terephthalate (PET), and cyclic polyolefins (COP).

The pores in the matrix of the heat-insulating layer 3 can be formed by using a foaming agent, a hollow filler, or the like. For example, organic microballoons, hollow glass beads, or the like can be used as the hollow filler.

The foaming agent is a substance that is decomposed by heating to generate, for example, nitrogen gas, carbon dioxide gas, carbon monoxide, ammonia gas, or the like. An organic foaming agent or an inorganic foaming agent can be used as the foaming agent.

Examples of the organic foaming agent include azo foaming agents such as azodicarbonamide (A. D. C. A) and azobisisobutyronitrile (A. I. B. N); nitroso foaming agents such as dinitrosopentamethylenetetramine (D. P. T) and N,N'-dinitroso-N,N'-dimethyl terephthalamide (D. N. D. M. T. A); hydrazides such as P-toluenesulfonyl hydrazide (T. S. H), P,P-oxybisbenzenesulfonyl hydrazide (O. B. S. H), and benzenesulfonyl hydrazide (B. S. H); trihydrazino triazine (T. H. T); and acetone-P-sulfonyl hydrazone. These organic foaming agents may be used alone or in combination of two or more thereof.

Examples of the inorganic foaming agent include sodium bicarbonate, ammonium carbonate, ammonium bicarbonate, sodium borohydride, sodium boron hydride, and silicon oxyhydride. In general, gas generation speeds of inorganic foaming agents are lower than those of organic foaming agents, and it is difficult to adjust the generation of the gas by using inorganic foaming agents. Therefore, organic foaming agents are preferable as chemical foaming agents.

The term "organic microballoon" refers to a type of hollow microspheres, and, for example, a hollow, spherical fine particle formed of an organic polymeric material such as a thermosetting resin, e.g., a phenolic resin; a thermoplastic resin, e.g., polyvinylidene chloride; or a rubber. Incorporation of organic microballoons in the heat-insulating layer 3 improves flexibility, heat resistance, and dimensional stability of the heat-insulating layer 3. Since the organic microballoons are spherical, stress anisotropy is unlikely to be caused even when the organic microballoons are incorporated in the composition that forms the heat-insulating layer 3. Accordingly, the organic microballoons are unlikely to decrease uniformity of a heat-insulating property and a hardness of the heat-insulating layer 3. Heat resistance of the heat-insulating layer 3 is further improved by using, as the organic microballoons, heat-resistant organic microballoons containing a thermosetting resin such as a phenolic resin. Commercially available organic microballoons may be used as the organic microballoons.

The average diameter of the organic microballoons is typically several micrometers or more and several hundreds of micrometers or less, and preferably 5 μm or more and 200 μm or less.

The upper limit of the porosity of the heat-insulating layer 3 is preferably 60%, more preferably 50%, and still more preferably 45%. The lower limit of the porosity of the heat-insulating layer 3 is preferably 5%, more preferably 10%, and still more preferably 15%. When the porosity of the heat-insulating layer 3 exceeds the upper limit, the heat-insulating layer 3 may have insufficient strength. When the porosity of the heat-insulating layer 3 is less than the lower limit, the heat-insulating layer 3 may have an insufficient heat-insulating property. Note that the porosity is a value measured as an area ratio when a cross section is observed with a microscope.

The upper limit of the average thickness of the heat-insulating layer 3 is preferably 500 mm, and more preferably 200 mm. The lower limit of the average thickness is 20 and more preferably 100 μm. When the average thickness exceeds the upper limit, the size of the self-heating fuser roller may be unnecessarily increased. When the average thickness is less than the lower limit, the heat-insulating layer 3 may have an insufficient the heat-insulating property, and the energy efficiency of the self-heating fuser roller may decrease.

The heat-insulating layer 3 and the resistor layer 1 are preferably joined to each other either directly or with another layer therebetween. By joining the heat-insulating layer 3 to the resistor layer 1, it is possible to prevent abrasion due to the friction of the inner circumferential surface (surface on the core bar 2 side) of the resistor layer 1 with the heat-insulating layer 3 or the other layer, and thus durability of the self-heating fuser roller is improved. In a specific example, the joining strength between the heat-insulating layer 3 and the resistor layer 1 can be improved by providing a primer layer between the heat-insulating layer 3 and the resistor layer 1.

<Advantages>

The self-heating fuser roller includes a resistor layer 1 having a plurality of slits 4 and thus has a plurality of heat-generating portions 5 that are electrically isolated by the slits and arranged in parallel. Therefore, according to the self-heating fuser roller, when cracks are formed in the resistor layer 1, the heat-generating portions 5 are torn, and the current consequently does not flow over the whole torn heat-generating portions 5. Thus, the current that is to bypass the cracks is blocked. With this structure, the self-heating fuser roller prevents a current from concentrating near the cracks and can suppress abnormal heat generation.

A releasing layer that accelerates separation of recording paper may be formed on a surface (outer circumferential surface of the resistor layer 1) of the self-heating fuser roller in FIG. 1.

Second Embodiment

Figure 4:
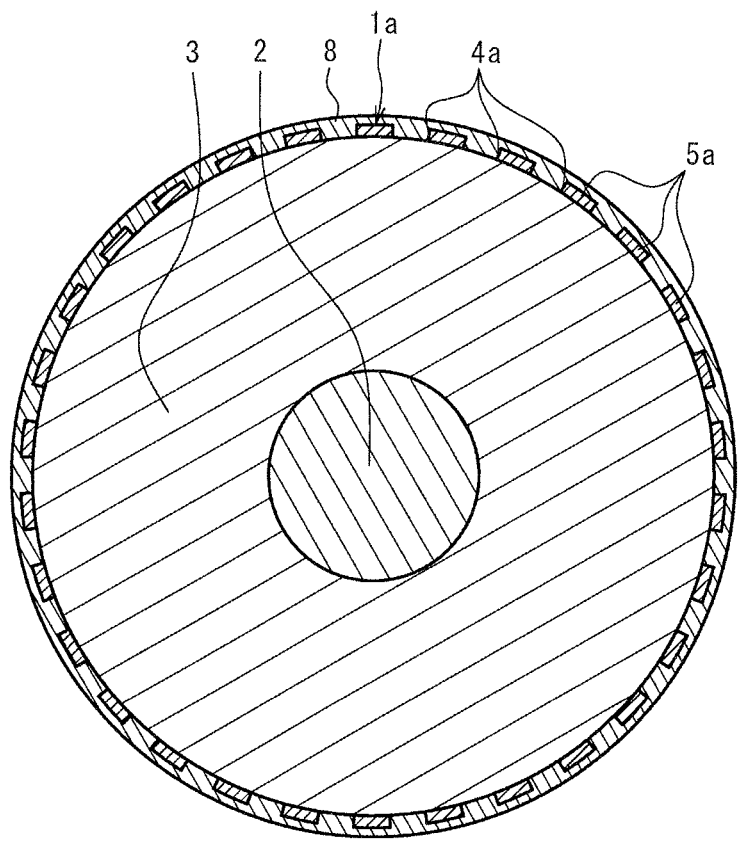
FIG. 4 is a schematic sectional view in the radial direction, the sectional view illustrating a self-heating fuser roller according to an embodiment different from the embodiment in FIG. 1.
Figure 5:
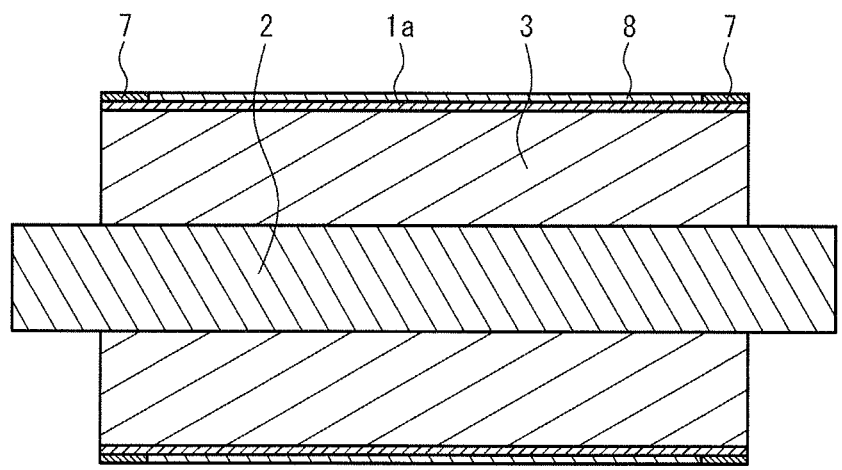
FIG. 5 is a schematic sectional view in the axial direction, the sectional view illustrating the self-heating fuser roller in FIG. 4.
Figure 6:
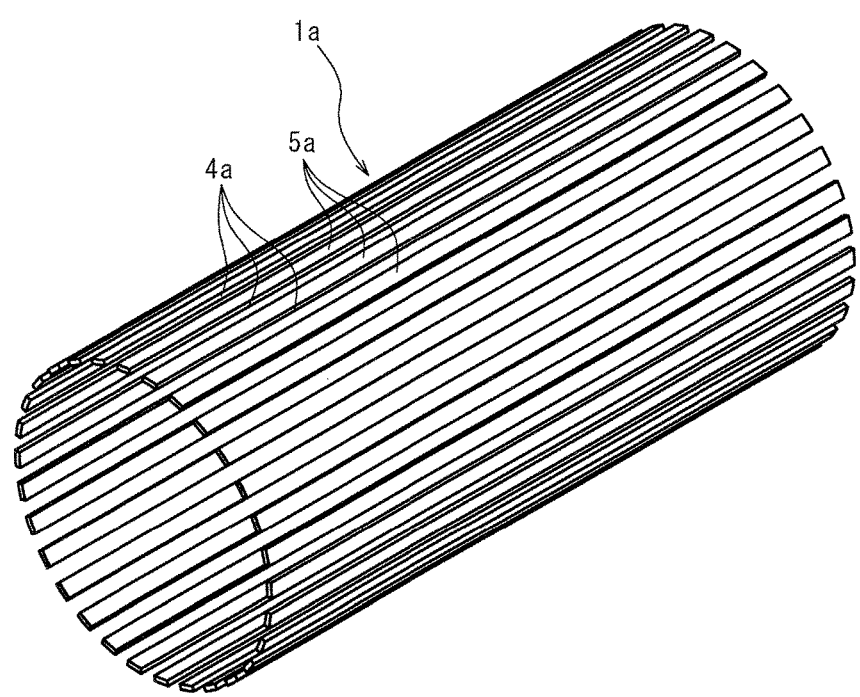
FIG. 6 is a schematic perspective view illustrating a resistor layer of the self-heating fuser roller in FIG. 4.

A self-heating fuser roller according to another embodiment of the present invention illustrated in FIGS. 4 and 5 includes a resistor layer 1a illustrated in FIG. 6. The self-heating fuser roller further includes a columnar core bar 2 and a cylindrical heat-insulating layer 3 formed on the outer circumferential surface of the core bar 2. The resistor layer 1a is formed on the outer circumferential surface of the heat-insulating layer 3. The self-heating fuser roller includes a pair of ring electrodes 7 formed on both ends of the outer circumference of the resistor layer 1a in the axial direction, and a releasing layer 8 formed on a portion between the pair of ring electrodes 7 on the outer circumferential surface of the resistor layer 1a.

The structures of the core bar 2 and the heat-insulating layer 3 in the self-heating fuser roller in FIGS. 1 and 2 may be the same as those of the core bar 2 and the heat-insulating layer 3 in the self-heating fuser roller in FIGS. 4 and 5.

<Resistor Layer>

The resistor layer 1a is formed to have a tubular shape. When electricity is supplied to the resistor layer 1a, joule loss occurs and the resistor layer 1a generates heat. This resistor layer 1a has a plurality of slits 4a that open on both end edges in the axial direction. Accordingly, the resistor layer 1a includes heat-generating portions 5a formed between the plurality of slits 4a.

The plurality of heat-generating portions 5a of the resistor layer 1a are electrically connected together by the ring electrodes 7 at both ends in the axial direction thereof.

The structure of the resistor layer 1a in the self-heating fuser roller in FIGS. 4 and 5 may be the same as that of the resistor layer 1 in the self-heating fuser roller in FIGS. 1 and 2 except that the slits 4a open on both ends in the axial direction thereof.

<Ring Electrode>

The ring electrodes 7 apply a uniform voltage between both ends of the plurality of heat-generating portions 5a. With this structure, a current is allowed to flow in the heat-generating portions 5a substantially uniformly so that the resistor layer 1a generates heat without unevenness.

The ring electrodes 7 are formed of a conductor having a sufficiently low electrical resistance. The ring electrodes 7 can be formed by using a metal foil, an electrically conductive paste, or the like. A copper foil is preferably used as the metal foil. A metal tape obtained by applying an electrically conductive adhesive onto a metal foil may be used.

<Releasing Layer>

The releasing layer 8 is formed on the outer circumferential surface of the heat-insulating layer 3 and comes in contact with a toner. This releasing layer 8 prevents a toner from adhering to the self-heating fuser roller.

The releasing layer 8 is formed of a resin composition. The plurality of slits 4a may be filled with the resin composition that forms the releasing layer 8.

Examples of a main component of the resin composition that forms the releasing layer 8 include thermoplastic resins and thermosetting resins.

Examples of the thermoplastic resins include vinyl resins, polyesters, polyolefins, acrylic resins, fluororesins, epoxy resins, phenolic resins, and urea resins. Among these, fluororesins, which have good releasability, good flexibility, and good heat resistance, are preferable. These resins may be used alone or as a mixture of two or more thereof.

Examples of the fluororesins include polytetrafluoroethylene (PTFE), tetrafluoroethylene-perfluoroalkylvinylether copolymers (PFA), tetrafluoroethylene-hexafluoropropylene copolymers (EFP), and tetrafluoroethylene-hexafluoropropylene copolymers (FEP). Among these, PFA or PTFE having a low molecular weight and good releasability is preferable.

The releasing layer 8 may contain an additive such as a thermally conductive filler. A thermally conductive filler incorporated in the releasing layer 8 can efficiently transfer heat of the resistor layer 1a to a toner and reduce a variation in the temperature of the surface of the self-heating fuser roller.

Examples of the thermally conductive filler include metals, ceramics, boron nitride, carbon nanotubes, alumina, and silicon carbide.

The releasing layer 8 preferably has an insulating property. Specifically, the lower limit of the electrical resistance per unit length of the releasing layer 8 in the axial direction is preferably $10^{14}$ Ω/m. When the electrical resistance per unit length of the releasing layer 8 is less than the lower limit, electric leakage may occur from the resistor layer 1a through the releasing layer 8, which may result in insufficient heat generation of the resistor layer 1a or may cause an electrical shock or malfunction of the apparatus.

The upper limit of the average thickness of the releasing layer 8 is preferably 50 μm, and more preferably 35 μm. The lower limit of the average thickness is preferably 1 and more preferably 5 μm. When the average thickness exceeds the upper limit, the size of the self-heating fuser roller may be unnecessarily increased, or the thermal efficiency of the self-heating fuser roller may decrease. When the average thickness is less than the lower limit, the releasing layer 8 may have insufficient strength.

The releasing layer 8 may be joined to the resistor layer 1a. Alternatively, the releasing layer 8 may be independently rotatable without being joined to the resistor layer 1a. However, the releasing layer 8 is preferably joined to the resistor layer 1a. By joining the releasing layer 8 to the resistor layer 1a, it is possible to prevent abrasion due to the friction of the inner circumferential surface (surface on the side that contacts the resistor layer 1a) of the releasing layer 8 with the resistor layer 1a, and thus durability of the self-heating fuser roller is improved. Examples of the method for joining the releasing layer 8 to the resistor layer 1a include, but are not particularly limited to, a method in which the joining is performed at the same time as the formation of the releasing layer 8 or the resistor layer 1a, and a method in which the joining is performed after the formation of the releasing layer 8 and the resistor layer 1a. In addition to use of any of these methods, by selecting a combination of the main component of the releasing layer 8 and the main component of the resistor layer 1a so as to have a high affinity, the releasing layer 8 and the resistor layer 1a can be more strongly joined to each other.

Examples of the method in which the joining is performed at the same time as the formation of the releasing layer 8 or the resistor layer 1a include a method including forming the resistor layer 1a by, for example, applying or extruding the resistor layer 1a onto the inner circumferential surface of the releasing layer 8, a method including forming the releasing layer 8 by, for example, applying or extruding the releasing layer 8 onto the outer circumferential surface of the resistor layer 1a, and a method including coextruding the releasing layer 8 and the resistor layer 1a.

Examples of the method in which the joining is performed after the formation of the releasing layer 8 and the resistor layer 1a include a method including bonding the releasing layer 8 to the resistor layer 1a with an adhesive, a method including performing a surface treatment, such as a plasma treatment, on a surface of the releasing layer 8, the surface being disposed on the side on which the resistor layer 1a is to be formed, and a method in which when the main component of the releasing layer 8 is a fluororesin, the releasing layer 8 and the resistor layer 1a are chemically bonded to each other by, for example, heating, irradiation with ionizing radiation, or application of a coupling agent.

Third Embodiment

Figure 7:
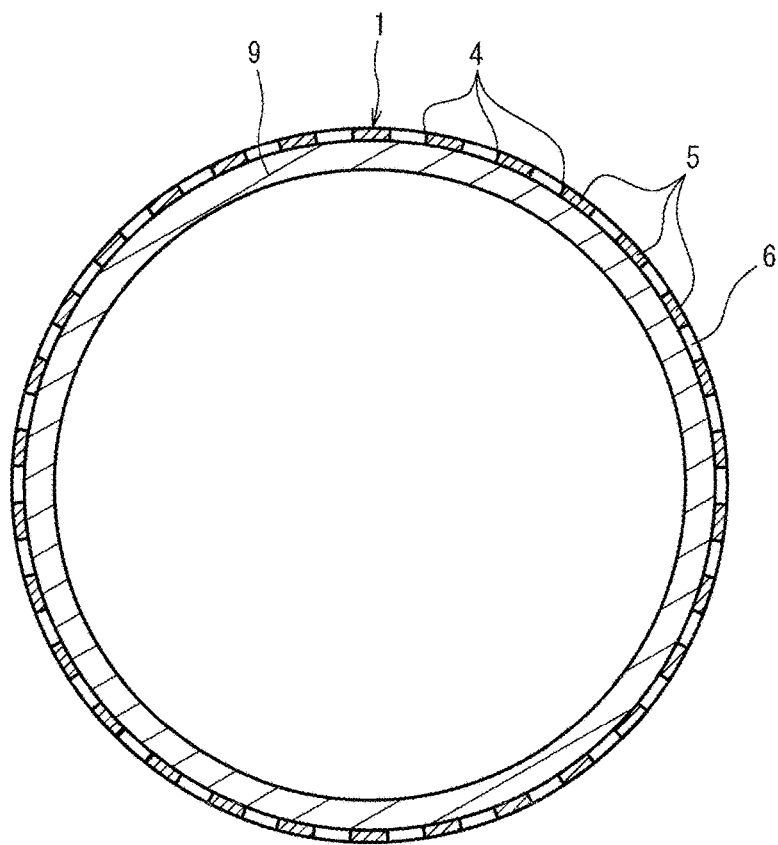
FIG. 7 is a schematic sectional view in the radial direction, the sectional view illustrating a self-heating fuser roller according to an embodiment of the present invention, the embodiment being different from the embodiments in FIGS. 1 and 4.

A self-heating fuser roller according to still another embodiment of the present invention illustrated in FIG. 7 includes an endless belt-like base 9 and a tubular resistor layer 1 that is formed on the outer circumferential surface of the base 9 and that generates heat by being supplied with electricity. The resistor layer 1 of the self-heating fuser roller in FIG. 7 is the same as the resistor layer 1 of the self-heating fuser roller in FIGS. 1 and 2. Therefore, the same components are assigned the same reference numerals, and the overlapping description is omitted.

The self-heating fuser roller is also referred to as a "fuser film" and is used, in a fuser, in a state in which a component that presses the self-heating fuser roller onto recording paper is disposed inside thereof.

<Base>

For example, a metal such as stainless steel, or a resin such as a polyimide is used as the base 9. The base 9 preferably has an insulating property. In the case where a conductive material such as a metal is used as the base 9, the self-heating fuser roller is formed so that insulation is ensured between the base 9 and at least the resistor layer 1.

The lower limit of the average thickness of the base 9 is preferably 10 μm, and more preferably 20 The upper limit of the average thickness of the base 9 is preferably 100 μm, and more preferably 80 μm. When the average thickness of the base 9 is less than the lower limit, the self-heating fuser roller may have insufficient strength. When the average thickness of the base 9 exceeds the upper limit, the self-heating fuser roller may have insufficient flexibility.

Also in the self-heating fuser roller in FIG. 7, the slits 4 of the resistor layer 1 are preferably filed with a resin composition, and a releasing layer may be formed on the outer circumferential surface of the resistor layer 1.

Fourth Embodiment

Figure 8:
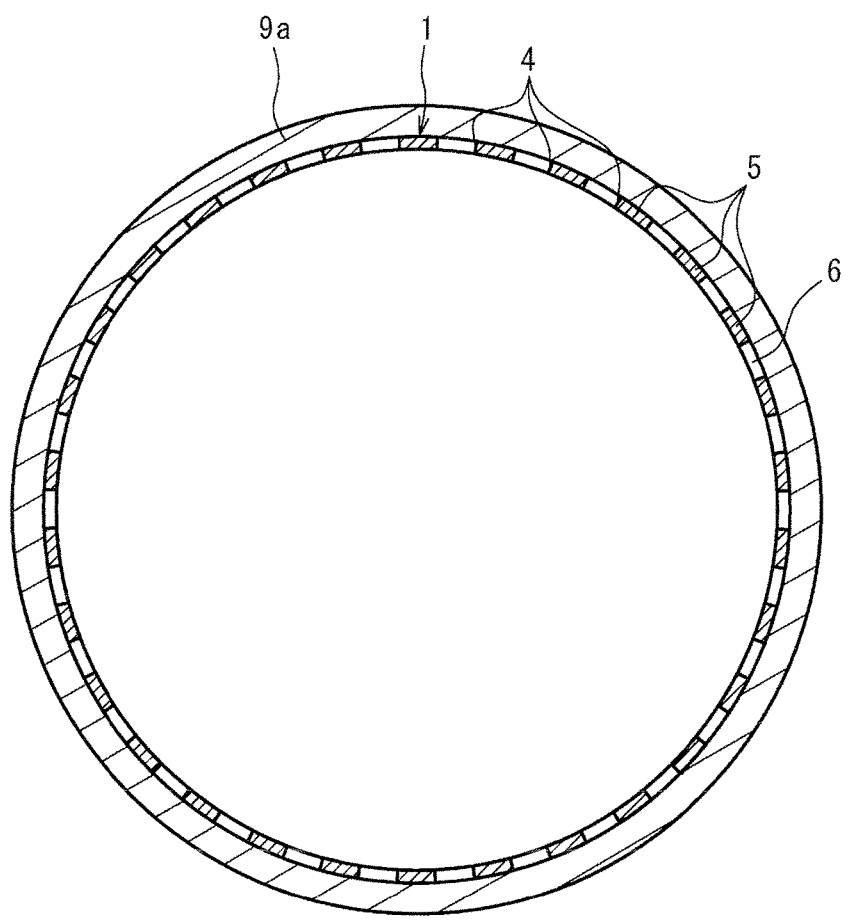
FIG. 8 is a schematic sectional view in the radial direction, the sectional view illustrating a self-heating fuser roller according to an embodiment of the present invention, the embodiment being different from the embodiments in FIGS. 1, 4, and 7.

A self-heating fuser roller according to still another embodiment of the present invention illustrated in FIG. 8 includes an endless belt-like base 9a and a tubular resistor layer 1 that is formed on the inner circumferential surface of the base 9a and that generates heat by being supplied with electricity. The resistor layer 1 of the self-heating fuser roller in FIG. 8 is the same as the resistor layer 1 of the self-heating fuser roller in FIGS. 1 and 2. Therefore, the same components are assigned the same reference numerals, and the overlapping description is omitted.

The self-heating fuser roller in FIG. 8 is also referred to as a "fuser film" as in the self-heating fuser roller in FIG. 7 and is used, in a fuser, in a state in which a component that presses the self-heating fuser roller onto recording paper is disposed inside thereof.

<Base>

For example, a metal such as stainless steel, or a resin such as a polyimide is used as the base 9a. The base 9a preferably has an insulating property. In the case where a conductive material such as a metal is used as the base 9a, the self-heating fuser roller is formed so that insulation is ensured between the base 9a and at least the resistor layer 1. In this self-heating fuser roller, since heat of the resistor layer 1 is transferred to a toner through the base 9a, the base 9a preferably has a relatively high thermal conductivity. Therefore, in the case where the base 9a is formed of a resin, the base 9a preferably contains a thermally conductive filler.

The average thickness of the base 9a of the self-heating fuser roller in FIG. 8 may be the same as that of the base 9 of the self-heating fuser roller in FIG. 7.

Other Embodiments

It is to be understood that the embodiments disclosed herein are only illustrative and are not restrictive in all respects. The scope of the present invention is not limited to the structures of the embodiments but is defined by the claims described below. It is intended that the scope of the present invention includes the meaning of equivalents of the claims and all modifications within the scope of the claims.

The self-heating fuser roller includes the resistor layer described above, and layers other than the resistor layer may have any structure as long as the advantages of the present invention are achieved. For example, an adhesive layer or a primer layer may be provided in order to improve adhesive strength between layers. The above-described layers in the self-heating fuser roller may have multilayer structures. The releasing layer that accelerates separation of recording paper is also optional.

The self-heating fuser roller may include ring electrodes also in the case where the resistor layer has connecting portions on both ends thereof.

In the self-heating fuser roller, the resistor layer may be formed of a woven fabric or non-woven fabric containing electrically conductive fibers. In particular, when the resistor layer is formed of a woven fabric, the slits may be formed by using a thread having an insulating property. Specifically, threads in the axial direction of the self-heating fuser roller are formed of an electrically conductive thread and an insulating thread that are regularly arranged, and all threads in the circumferential direction of the self-heating fuser roller are formed of an insulating thread. Consequently, the insulating thread in the axial direction forms the slits that open on both end edges in the axial direction.

REFERENCE SIGNS LIST 1, 1a resistor layer 2 core bar 3 heat-insulating layer
4, 4a slit 5, 5a heat-generating portion
6 connecting portion 7 ring electrode 8 releasing layer 9, 9a base

The invention claimed is:

1. A self-heating fuser roller comprising a tubular resistor layer that generates heat by being supplied with electricity,
   wherein the resistor layer has a plurality of slits;
   the slits have an average interval of 30 μm or more and 1 mm or less;
   the slits are filled with a resin composition having an insulating property; and
   the slits are disposed at regular intervals in a circumferential direction.

2. The self-heating fuser roller according to claim 1, wherein the slits extend in an axial direction.

3. The self-heating fuser roller according to claim 1, wherein the slits are not provided on both end edges in an axial direction.

4. The self-heating fuser roller according to claim 1, wherein the slits have an average width of 50 μm or more and 2 mm or less.

5. The self-heating fuser roller according to claim 1, wherein the resistor layer includes a resin matrix and a plurality of electrically conductive particles contained in the resin matrix.

* * * * *